US012085979B2

(12) United States Patent
Catt

(10) Patent No.: US 12,085,979 B2
(45) Date of Patent: Sep. 10, 2024

(54) CLOCK SYNCHRONISATION

(71) Applicant: Commonwealth Scientific and Industrial Research Organisation, Acton (AU)

(72) Inventor: Gavin Catt, Brisbane (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 0 days.

(21) Appl. No.: 18/326,497

(22) Filed: May 31, 2023

(65) Prior Publication Data

US 2023/0418325 A1     Dec. 28, 2023

(30) Foreign Application Priority Data

Jun. 24, 2022  (AU) .............................. 2022901753
Feb. 1, 2023  (AU) .............................. 2023200522

(51) Int. Cl.
*G06F 1/12* (2006.01)
*G06F 1/10* (2006.01)
(Continued)

(52) U.S. Cl.
CPC .................. *G06F 1/12* (2013.01); *G06F 1/10* (2013.01); *G06F 1/14* (2013.01); *H04L 7/0008* (2013.01)

(58) Field of Classification Search
CPC ..... G06F 1/10; G06F 1/12; G06F 1/14; H04L 7/0008
(Continued)

(56) References Cited

U.S. PATENT DOCUMENTS 10,771,669 B1 *  9/2020  Balasubramanian ... G01S 17/87
11,063,738 B1    7/2021  Wang
(Continued)

FOREIGN PATENT DOCUMENTS

CN  100498232 C  6/2009
CN  103616710 A  3/2014
(Continued)

OTHER PUBLICATIONS

Ding, W. et al., "Time Synchronization Error and Calibration in Integrated GPS/INS Systems", ETRI Journal, 2008, vol. 30 (1), pp. 59-67.
(Continued)

*Primary Examiner* — Ji H Bae
(74) *Attorney, Agent, or Firm* — Goodwin Procter LLP

(57) ABSTRACT

A method of performing clock synchronisation across multiple devices, the method including: in a first device: emitting timing pulses based on a first clock signal; and, outputting event data including events associated with first event times based on the first clock signal; in a second device: receiving the timing pulses; and, generating reference data including an indication of each timing pulse associated with a reference time based on a second clock signal; and, in one or more processing devices: receiving the event data; recording an approximate local event time for each event based on a time of local receipt determined using a local clock signal; using the local event times and first event times to derive a first function that relates the first clock signal and the local clock signal; using the first function and the reference data to derive a synchronisation function relating the first and second clock signals; and, using the synchronisation function to perform clock synchronisation of the first and second clock signals.

22 Claims, 6 Drawing Sheets

(51) Int. Cl.
*G06F 1/14* (2006.01)
*H04L 7/00* (2006.01)

(58) Field of Classification Search
USPC .......................................... 713/400, 503, 375
See application file for complete search history.

(56) References Cited

U.S. PATENT DOCUMENTS

| | | | |
|---|---|---|---|
| 2020/0014525 A1* | 1/2020 | Nasr | G05D 1/021 |
| 2020/0064859 A1* | 2/2020 | Zhang | G06F 1/12 |
| 2020/0064862 A1* | 2/2020 | Kwan | G05D 1/0278 |
| 2020/0217666 A1 | 7/2020 | Zhang et al. | |
| 2020/0357205 A1 | 11/2020 | Bennington et al. | |
| 2022/0182213 A1* | 6/2022 | Han | G01C 21/28 |

FOREIGN PATENT DOCUMENTS

| | | |
|---|---|---|
| EP | 3454089 A1 | 3/2019 |
| EP | 3839570 A1 | 6/2021 |
| JP | 2007-189678 A | 7/2007 |
| JP | 2011-114616 A | 6/2011 |
| JP | 2020-507072 A | 3/2020 |
| TW | I432764 B | 4/2014 |
| TW | I551879 B | 10/2016 |
| WO | WO-2016/191020 A1 | 12/2016 |
| WO | WO-2020/113358 A1 | 6/2020 |

OTHER PUBLICATIONS

Examination Report No. 1 for Australian Patent Application No. 2023200522, dated Feb. 28, 2023 (5 pages).
International Type Search for Australian Patent Application No. 2022901753 dated Aug. 24, 2022 (22 pages).
Li, S. et al., "Fusion of RTK GNSS receiver and IMU for accurate vehicle tracking", International Global Navigation Satellite Systems Symposium (IGNSS) 2018 Proceedings, University of New South Wales (16 pages).
Notice of Acceptance of Australian Patent Application No. 2023200522 dated Mar. 30, 2023 (3 pages).

* cited by examiner

CLOCK SYNCHRONISATION

CROSS-REFERENCE TO RELATED APPLICATION

This application claims priority to and the benefit of, and incorporates herein by reference in their entireties, Australian Patent Application No. 2023200522, which was filed on Feb. 1, 2023, and Australian Patent Application No. 2022901753, which was filed on Jun. 24, 2022.

TECHNICAL FIELD

The present invention relates to a system and method for performing clock synchronisation across multiple devices.

BACKGROUND

The reference in this specification to any prior publication (or information derived from it), or to any matter which is known, is not, and should not be taken as an acknowledgement or admission or any form of suggestion that the prior publication (or information derived from it) or known matter forms part of the common general knowledge in the field of endeavour to which this specification relates.

Clock synchronization is a process that aims to coordinate otherwise independent clocks. In this regard, even when clocks are initially accurately set, clocks will differ after some amount of time due to clock drift, caused by clocks counting time at slightly different rates, which can in turn lead to data processing issues. This is particularly noticeable in situations where a time of data capture/generation is important in interpreting or otherwise analysing the data. For example, in application such as autonomous vehicles, sensor data is typically captured from multiple different sensors as the vehicle moves through the environment. The captured data is typically associated with a time of capture, based a clock that is local to that sensor, meaning that if clocks for the different sensors are not synchronised, then it can appear as though data captured simultaneously was captured at different times. Thus, in this situation, if an event has occurred, such as detection of an object, then it can appear as though the event occurred at different times, which can in turn make interpretation of the event difficult.

A number of mechanisms exist for performing clock synchronisation. For example, a master clock can be used to generate and output a timing pulse, sometimes referred to a Pulse Per Second (PPS) signal, which is based on the master clock. This PPS signal is then received by different devices, which synchronise their own internal clock with the master clock using the PPS signal.

However, not all devices are capable of receiving and performing synchronisation using a PPS signal. For example, GPS (Global Positioning System) devices typically utilise a clock signal derived from satellite signals, which is required for the GPS system to function effectively. Accordingly, devices of this form are not able to synchronise their own internal clock with a separate master clock.

Such systems may generate their own PPS signal. However, it is not always feasible to use this PPS signal for synchronisation. For example, if data from the GPS device is to be combined with data from other sensors, these other sensors are often synchronised to a master clock, which itself may not be able to use an external PPS signal for synchronisation. Additionally, the clock signal in GPS systems may periodically change, for example if new satellites are acquired, meaning it is not possible to use the PPS signal from a GPS device as a master clock, and so this make synchronisation of GPS and other sensor data problematic.

Similar issues arise with other devices, such as LiDAR, which are also unable to synchronise to an external clock signal due to their own internal processing requirements. These issues can make sensor fusion across multiple devices problematic, which is particularly pronounced in autonomous vehicles and other similar applications, where fusion of data from multiple sensors can be critical in ensuring accurate positional sensing and navigation.

SUMMARY OF THE INVENTION

In one broad form, an aspect of the present invention seeks to provide a method of performing clock synchronisation across multiple devices, the method including: in a first device: emitting timing pulses based on a first clock signal; and, outputting event data including events associated with first event times based on the first clock signal; in a second device: receiving the timing pulses; and, generating reference data including an indication of each timing pulse associated with a reference time based on a second clock signal; and, in one or more processing devices: receiving the event data; recording an approximate local event time for each event based on a time of local receipt determined using a local clock signal; using the local event times and first event times to derive a first function that relates the first clock signal and the local clock signal; using the first function and the reference data to derive a synchronisation function relating the first and second clock signals; and, using the synchronisation function to perform clock synchronisation of the first and second clock signals.

In one embodiment the method includes, in the one or more processing devices: determining a second function that relates the second clock signal and the local clock signal; and, using the second function to determine the synchronisation function.

In one embodiment the method includes: in the second device, outputting the reference data; and, in the one or more processing devices, receiving the reference data; recording an approximate local reference time for each timing pulse based on a time of local receipt determined using the local clock signal; and, using the local reference times and reference times to derive the second function.

In one embodiment the method includes, in the one or more processing devices: using the first function and the reference data to recover approximate first reference times for the timing pulses; resolving an accurate first reference time for the timing pulses; and, using the accurate first reference time to determine the third function.

In one embodiment the second clock is the local clock and the one or more processing devices are part of the second device.

In one embodiment the second device is a master clock used to synchronise a number of other devices.

In one embodiment at least one function is based on a linear fit.

In one embodiment the method includes, in the one or more processing devices, using the synchronisation function to calculate second event times based on the second clock signal to synchronise events with the second clock signal.

In one embodiment the method includes, in the one or more processing devices: comparing received event data to the first function; and, selectively recalculating at least one function depending on results of the comparison.

In one embodiment the method includes, in the one or more processing devices, recalculating at least one function if a discrepancy is identified based on results of the comparison.

In one broad form, an aspect of the present invention seeks to provide a method of performing clock synchronisation across multiple devices, the method including: in a first device: emitting timing pulses based on a first clock signal; and, outputting event data including events associated with first event times based on the first clock signal; in a second device: receiving the timing pulses; and, outputting reference data including an indication of each timing pulse associated with a reference time based on a second clock signal; and, in one or more processing devices: receiving the event data; recording an approximate local event time for each event based on a time of local receipt determined using a local clock signal; using the local event times and first event times to derive a first function that relates the first clock signal and the local clock signal; receiving the reference data; recording an approximate local reference time for each timing pulse based on a time of local receipt determined using the local clock signal; using the local reference times and reference times to derive a second function that relates the second clock signal and the local clock signal; using the first and second functions and the reference data to determine a third function relating the first and second clock signals; and, using the third function to perform clock synchronisation of the first and second clock signals.

In one broad form, an aspect of the present invention seeks to provide an apparatus for performing clock synchronisation across multiple devices including: a first device configured to: emit timing pulses based on a first clock signal; and, output event data including events associated with first event times based on the first clock signal; and, a second device configured to: receive the timing pulses; and, generate reference data including an indication of each timing pulse associated with a reference time based on a second clock signal, the apparatus including [in] one or more processing devices configured to: receive the event data; record an approximate local event time for each event based on a time of local receipt determined using a local clock signal; use the local event times and first event times to derive a first function that relates the first clock signal and the local clock signal; use the first function and the reference data to derive a synchronisation function relating the first and second clock signals; and, use the synchronisation function to perform clock synchronisation of the first and second clock signals.

In one embodiment the one or more processing devices are configured to: determine a second function that relates the second clock signal and the local clock signal; and, use the second function to determine the synchronisation function.

In one embodiment the one or more processing devices are configured to: receive the reference data from the second device; record an approximate local reference time for each timing pulse based on a time of local receipt determined using the local clock signal; and, use the local reference times and reference times to derive the second function.

In one embodiment the one or more processing devices are configured to: use the first function and the reference data to recover approximate first reference times for the timing pulses; resolve an accurate first reference time for the timing pulses; and, use the accurate first reference time to determine the third function.

In one embodiment the second clock is the local clock and the one or more processing devices are part of the second device.

In one embodiment the second device is a master clock used to synchronise a number of other devices.

In one embodiment at least one function is based on a linear fit.

In one embodiment the one or more processing devices are configured to use the synchronisation function to calculate second event times based on the second clock signal to synchronise events with the second clock signal.

In one embodiment the one or more processing devices are configured to: compare received event data to the first function; and, selectively recalculate at least one function depending on results of the comparison.

In one embodiment the one or more processing devices are configured to recalculate at least one function if a discrepancy is identified based on results of the comparison.

In one broad form, an aspect of the present invention seeks to provide an apparatus for performing clock synchronisation across multiple devices including: a first device configured to: emit timing pulses based on a first clock signal; and, output event data including events associated with first event times based on the first clock signal; and, a second device configured to: receive the timing pulses; and, output reference data including an indication of each timing pulse associated with a reference time based on a second clock signal, wherein the apparatus includes one or more processing devices configured to: receive the event data; record an approximate local event time for each event based on a time of local receipt determined using a local clock signal; use the local event times and first event times to derive a first function that relates the first clock signal and the local clock signal; receive the reference data; record an approximate local reference time for each timing pulse based on a time of local receipt determined using the local clock signal; use the local reference times and reference times to derive a second function that relates the second clock signal and the local clock signal; use the first and second functions and the reference data to determine a third function relating the first and second clock signals; and, use the third function to perform clock synchronisation of the first and second clock signals.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which.

DETAILED DESCRIPTION

Figure 1A:
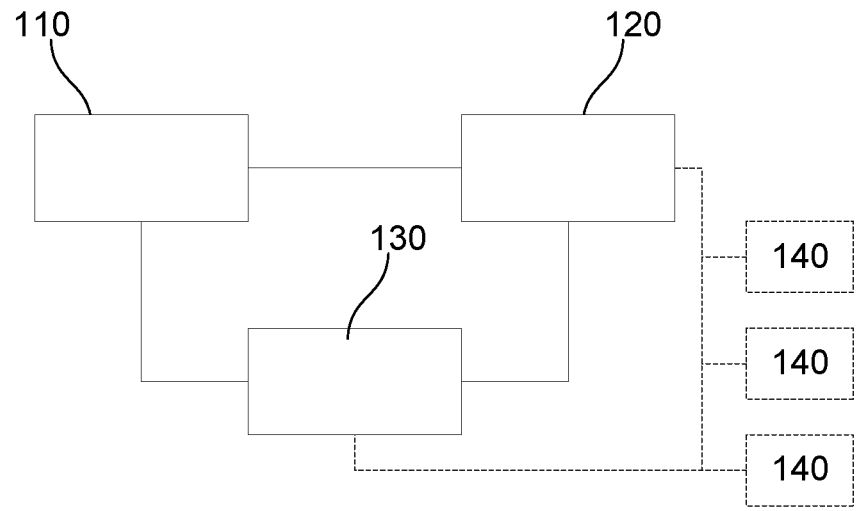
FIG. 1A is a schematic diagram of a first example of a system requiring clock synchronisation.
Figure 1B:
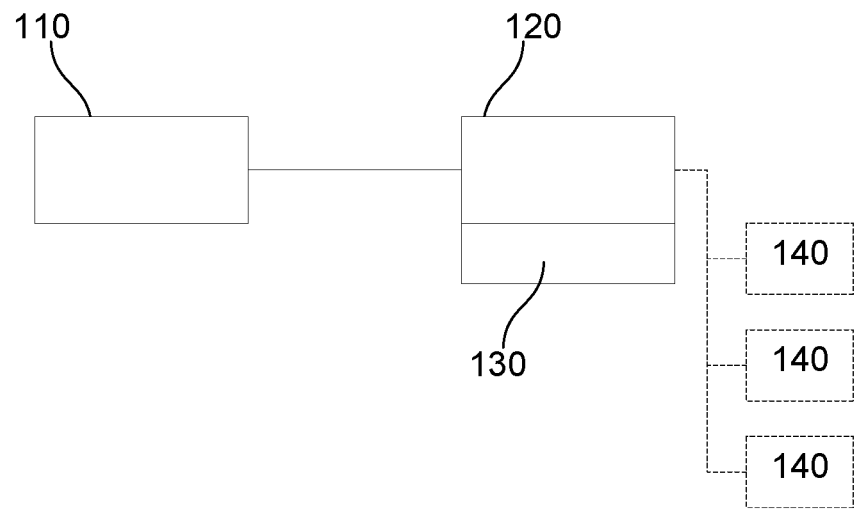
FIG. 1B is a schematic diagram of a second example of a system requiring clock synchronisation.

Examples of systems requiring clock synchronisation will now be described with reference to FIGS. 1A and 1B.

In this example, the system includes a first device 110, a second device 120 and one or more processing devices 130.

The first and second devices 110, 120 can be of any appropriate form, depending on the preferred implementation and/or the nature of the devices being synchronised.

In general, the first device 110 includes a first clock, which is used internally, for example to time stamp event data relating to one or more events. The first device 110 is typically unable to synchronise the first clock signal with an external master or other similar clock signal based on received synchronisation signals, such as PPS signals. In the sensing field, examples of such first devices are GPS devices, which require the first clock to be synchronised with satellite systems, in order to allow the device to accurately determine its position, or LiDAR sensors, which typically require a dedicated internal clock to accurately interpret optical reflections from the environment. Nevertheless, the first device 110 is typically capable of generating timing pulses, such as a PPS signal, based on the first clock signal.

In contrast, the second device 120 is typically a device that includes a second clock signal, which acts as a master clock signal to allow for synchronisation of multiple other devices 140. For example, in the sensing field, the second device 120 can be a micro/master clock unit that generates master clock signal pulses, which can be used by other devices for syncing their own clock with the master clock, or which can use the pulses in lieu of an internal clock. In the field of sensing, this could be used, for example, to allow data collected by a sensing device, such as an Inertial Measurement Unit (IMU), to be synchronised with the second (master) clock.

In general, the second device 120 is capable of receiving PPS signals generated by the first device. However, the second device 120 would not adapt the second clock signal to the first clock signal, as the first clock signal might not be consistent. For example, in the case of a GPS sensor, when the GPS sensor acquires new satellite signals, this can cause the first clock to re-synchronise leading to discontinuities in the clock signal. Whilst this is not an issue for the GPS sensor, this could cause problems in interpretation of data from other sensing devices, if this was used as a master clock signal.

The system also includes the one or more processing devices 130, which are typically used to interpret data generated by the first and other devices 110, 140, for example, using sensor data from a GPS and/or LiDAR 110, and an IMU in order to perform simultaneous localisation and mapping. Whilst the system can use multiple processing devices, with processing performed by one or more of the processing devices, for the purpose of ease of illustration, the following examples will refer to a single processing device, but it will be appreciated that reference to a singular processing device should be understood to encompass multiple processing devices and vice versa, with processing being distributed between the processing devices as appropriate.

The processing device 130 typically uses its own internal clock, hereinafter referred to as a local clock signal, when interpreting data received from the devices 110, 120, 140. In one example, the processing device 130 can form part of one or more separate processing systems, as in the example of FIG. 1A, in which case data is generally received from the devices 110, 120, 140 via wired and/or wireless connections, optionally via communications networks or similar, which may be subject to transmission issues, such as variable latencies or the like. In this example, the local clock signal is therefore different to the first and second clock signals. In another example, the processing device could be part of, associated with, or include, the second device 120, as shown in FIG. 1B. In this example, the second and local clock signals could be identical or effectively the same, for example through internal synchronisation. In either arrangement, the PPS signals from the first device 110 are typically transmitted directly to the second device 120 as electronic pulses, either via wired or wireless connections, so these are received consistently by the second device 120.

Figure 2:
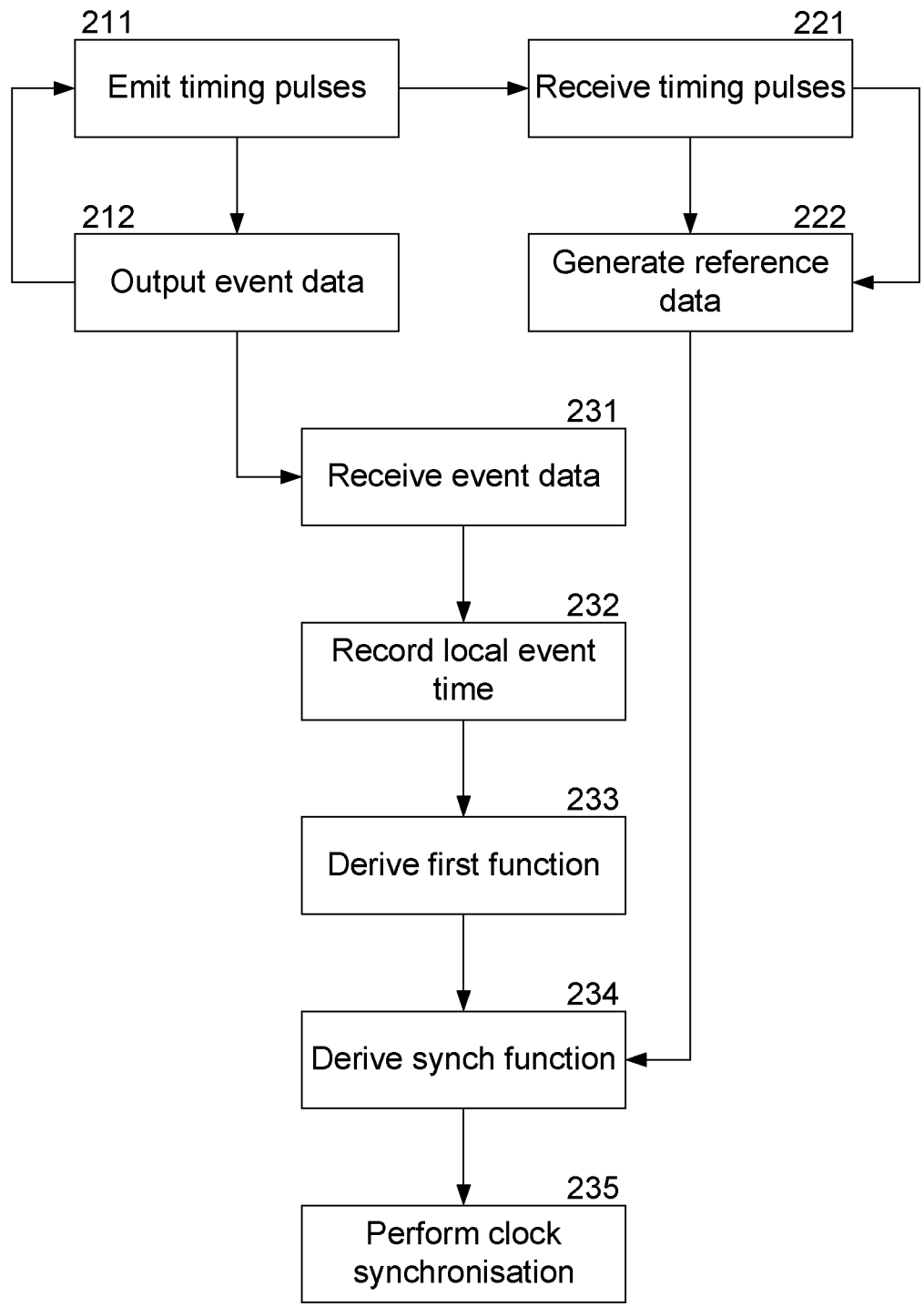
FIG. 2 is a flow chart of an example of a method for use in performing clock synchronisation.

An example of a process for performing clock synchronisation will now be described with reference to FIG. 2.

In this example, at step 211, the first device emits timing pulses, such as PPS pulses, based on the first clock signal. The first device also outputs event data at step 212, with the event data typically including events associated with first event times based on the first clock signal. Thus, in one example, a GPS device 110 generates positional information, such as a latitude and longitude associated with a time stamp based on the first clock signal. It will be appreciated that this process repeats as long as the first device 110 is operational.

Simultaneously, the second device 120 receives the timing pulses at step 221, and generates reference data at step 222 including an indication of each timing pulse associated with a reference time indicative of the time of receipt by the second device 120. In this case, the reference time is based on the second clock signal. Again this process repeats while the second device is operational.

At step 231, the processing device 130 receives the event data from the first device 110, and records an approximate local event time, for each event, at step 232. The local event time is based on a time of local receipt by the processing device 130 and is determined using a local clock signal. At step 233, the processing device 130 uses the local event times and the first event times associated with multiple events to derive a first function that relates the first clock signal and the local clock signal. In this regard, the process of transmitting event data to the processing device can introduce variable delays, for example, due to transmission latency, so that there is not necessarily a consistent offset between the first and local clock signals. Accordingly, using a function, such as a linear regression, polynomial function, or similar, can be used to calculate a relationship such as an approximate offset between the first and local clocks. It will be appreciated from this that the first function can be of any suitable form, and could include, for example, a linear regression, polynomial function, or the like.

At step 234, the processing device uses the first function and the reference data from the second device to derive a synchronisation function relating the first and second clock signals. It will be appreciated that if the processing device 130 is associated with the second device, the second and local clock signals could be the same and/or associated with a fixed offset, in which case, the synchronisation function can be easily related to the first function. However, in the event the second device and processing device 130 are separate, and the reference data is subject to variable transmission delays to the processing device, deriving the synchronisation function is more complex, and can require a second function that is derived based on a local receipt time of the reference data, as will be described in more detail below. In any event, the synchronisation function can be of any suitable form, and could include, for example, a linear regression, polynomial function, or similar.

Once the synchronisation function has been determined, this can be used at step 235 to perform clock synchronisation of the first and second clock signals. For example, the synchronisation function can be used to map events between the first and second clock signals, so that, for example, the timing of events within the event data can be converted from the first to the second clock signal, allowing this to be processed along with data from the other devices 140, which are also timed based on the second clock signal.

Accordingly, it will be appreciated that the above described process allows post processing to be used to perform effective clock synchronisation between devices that cannot otherwise be synchronised. In particular, this approach uses a local time of receipt of data to derive a synchronisation function, which can then be used to convert event timing between different clock signals, thereby allowing data captured with a time based on a first time signal to be converted to a time based on a second time signal (and vice versa). This process therefore extends the functionality of existing hardware, enabling devices that cannot normally be synchronised to be synchronised using post processing.

A number of further features will now be described.

As mentioned above, when the second and local clock signals are different, further processing is required to derive the synchronisation function. In this example, the processing device 130 determines a second function that relates the second clock signal and the local clock signal and then uses the second function to derive the synchronisation function. Specifically, when the second device 120 and processing device are in communication via a communications channel subject to variable delays, the second device is configured to output the reference data, with the processing device receiving the reference data, and recording an approximate local reference time for each timing pulse based on a time of local receipt determined using the local clock signal. Following this, the processing device uses the local reference times and reference times to derive the second function. The second function can be of any suitable form, and could include, for example, a linear regression, polynomial function, or similar, depending on the relationship between the second and local clocks.

In one example, the processing device uses the first function and the reference data to recover approximate first reference times for the timing pulses. The processing device then resolves an accurate first reference time for the timing pulses and uses the accurate first reference time to determine the third function. In general, this is performed based on the knowledge that there is a fixed time interval between the timing pulses, and so once the approximate time has been derived, this can be adjusted so that the fixed time interval is present, resulting in the calculation of an accurate first reference time for each timing pulse.

In general the second clock is used as a master clock allowing data from multiple different devices 110, 140 to be synchronised, although it will be appreciated that as functions are established relating the first, second and local clocks, this is not essential and any of the clock signals could act as a master clock. Assuming however that the second clock is used as the master clock, the processing device can use the synchronisation function to calculate second event times based on the second clock signal to synchronise events captured by the first device with the second clock signal. Again, it will be appreciated that other calculations can be used to covert to other clock signal timing as needed.

As mentioned above, the functions, such as the first, second, or synchronisation functions are typically based on a linear fit on the assumption that there is generally a relatively constant offset between the clocks, with additionally variations being introduced by transmission delays between the first and second devices 110, 120 and the processing devices 130. However, it will be appreciated that other functions could be used if required.

In addition to perform the above described process, the approach can also be used to detect changes in clock signals and update the synchronisation functions as needed. This situation might arise for example, in the event that the first device is a GPS device that re-acquires satellite connectivity, and recalculates the first clock. In this instance, the processing device can detect this by comparing the received event data to the first function and then selectively recalculating at least one function depending on results of the comparison. In particular, the processing device can use the comparison to determine there is a discrepancy, which might occur for example if event time and local time differ to what would be expected given the first function. Such a discrepancy might be detected over a number of events, with the first function then being recalculated using timing data for new events, as needed.

Figure 3:
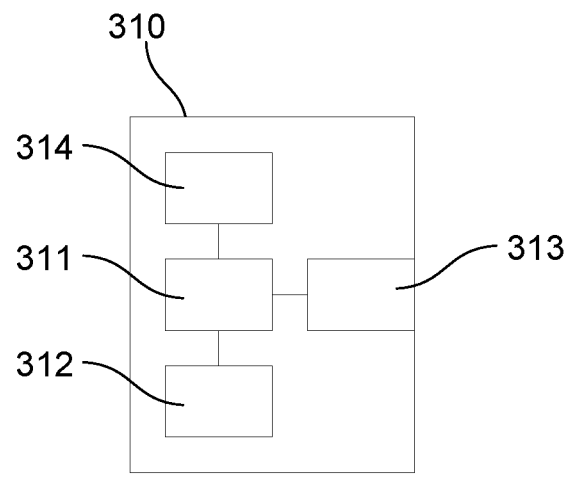
FIG. 3 is a schematic diagram of an example of a first device.

A specific example of a first device will now be described in more detail with reference to FIG. 3.

In this example, the first device 310 includes at least one microprocessor 311, a memory 312, an external interface 313, and a sensor 314, such as a GPS receiver.

In this example the external interface 313 can be utilised for connecting the first device 310 to a communication channel, such as a communications network, or the like, depending on the preferred implementation. Although a single external interface 313 is shown, this is for the purpose of example only, and in practice multiple interfaces using various methods (e.g. Ethernet, serial, USB, wireless or the like) may be provided.

In use, the microprocessor 311 executes instructions in the form of applications software stored in the memory 312 to allow the required processes to be performed. The applications software may include one or more software modules, and may be executed in a suitable execution environment, such as an operating system environment, or the like. The microprocessor 311 typically receives signals from the sensor, and uses these to generate and time stamp event data. In the event that the first device is a GPS receiver, the sensor 314 will detect satellite signals, with these being analysed by the microprocessor 311 to extract the first clock signals and calculate a location, which is then stored as the event data. The event data is then transmitted via the interface 313, whilst a PPS signal based on the first clock signal can also be separately emitted.

Figure 4:
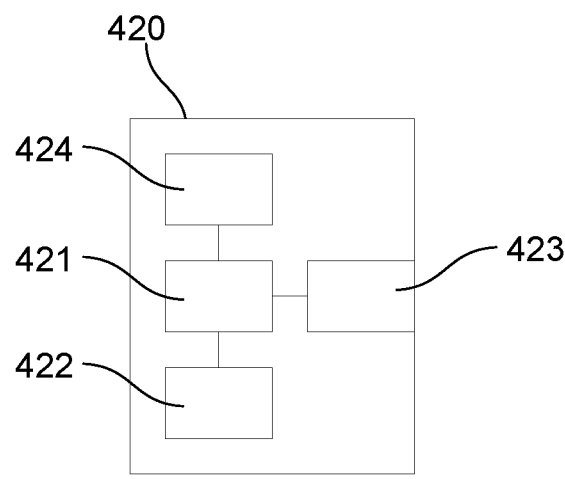
FIG. 4 is a schematic diagram of an example of a second device.

A specific example of a second device will now be described in more detail with reference to FIG. 4.

In this example, the second device 420 includes at least one microprocessor 421, a memory 422, an external interface 423, and a clock 424.

In this example the external interface 423 can be utilised for connecting the second device 420 to a communication channel, such as a communications network, or the like, depending on the preferred implementation. Although a single external interface 423 is shown, this is for the purpose of example only, and in practice multiple interfaces using various methods (e.g. Ethernet, serial, USB, wireless or the like) may be provided.

In use, the microprocessor 421 executes instructions in the form of applications software stored in the memory 422 to allow the required processes to be performed. The applications software may include one or more software modules, and may be executed in a suitable execution environment, such as an operating system environment, or the like. The microprocessor 421 typically receives PPS signals from the first device 310 via the interface 423, and time stamps these based on a time of receipt determined from the second clock signal obtained from the clock 424. Resulting reference data is then output via the interface 423.

Figure 5:
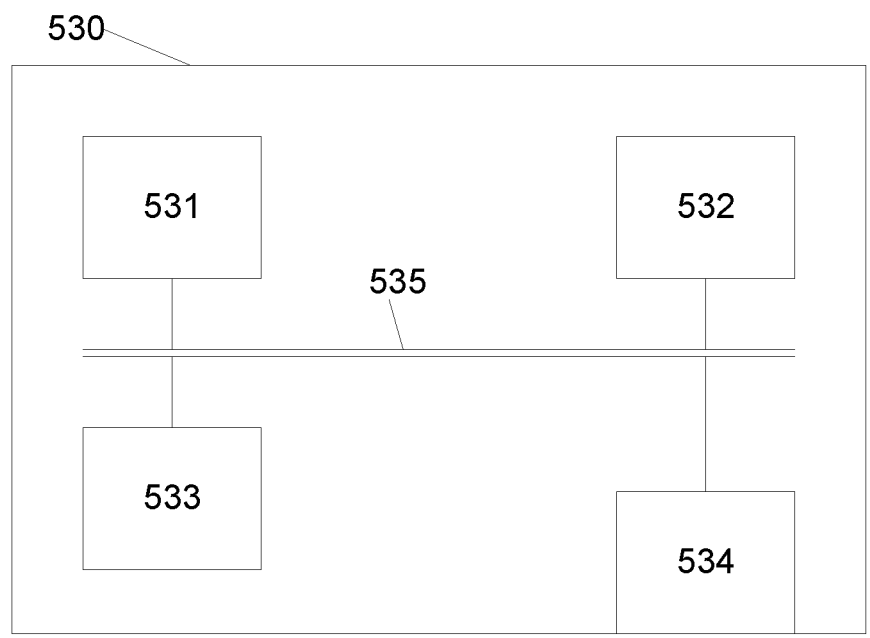
FIG. 5 is a schematic diagram of an example of a processing system.

A specific example of a processing system 530 including a processing device used for processing data from the first and second devices, and one or more other devices, will now be described in more detail with reference to FIG. 5.

In this example, the processing system 530 includes at least one microprocessor 531, a memory 532, an optional input/output device 533, such as a keyboard and/or display, and an external interface 534, interconnected via a bus 535 as shown. In this example the external interface 534 can be utilised for connecting the processing system 530 to peripheral devices, such as the communications networks, or the like. Although a single external interface 534 is shown, this is for the purpose of example only, and in practice multiple interfaces using various methods (e.g. Ethernet, serial, USB, wireless or the like) may be provided.

In use, the microprocessor 531 executes instructions in the form of applications software stored in the memory 532 to allow the required processes to be performed. The applications software may include one or more software modules, and may be executed in a suitable execution environment, such as an operating system environment, or the like.

Accordingly, it will be appreciated that the processing system 530 may be formed from any suitable processing system, such as a suitably programmed client device, PC, web server, network server, or the like. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 6:
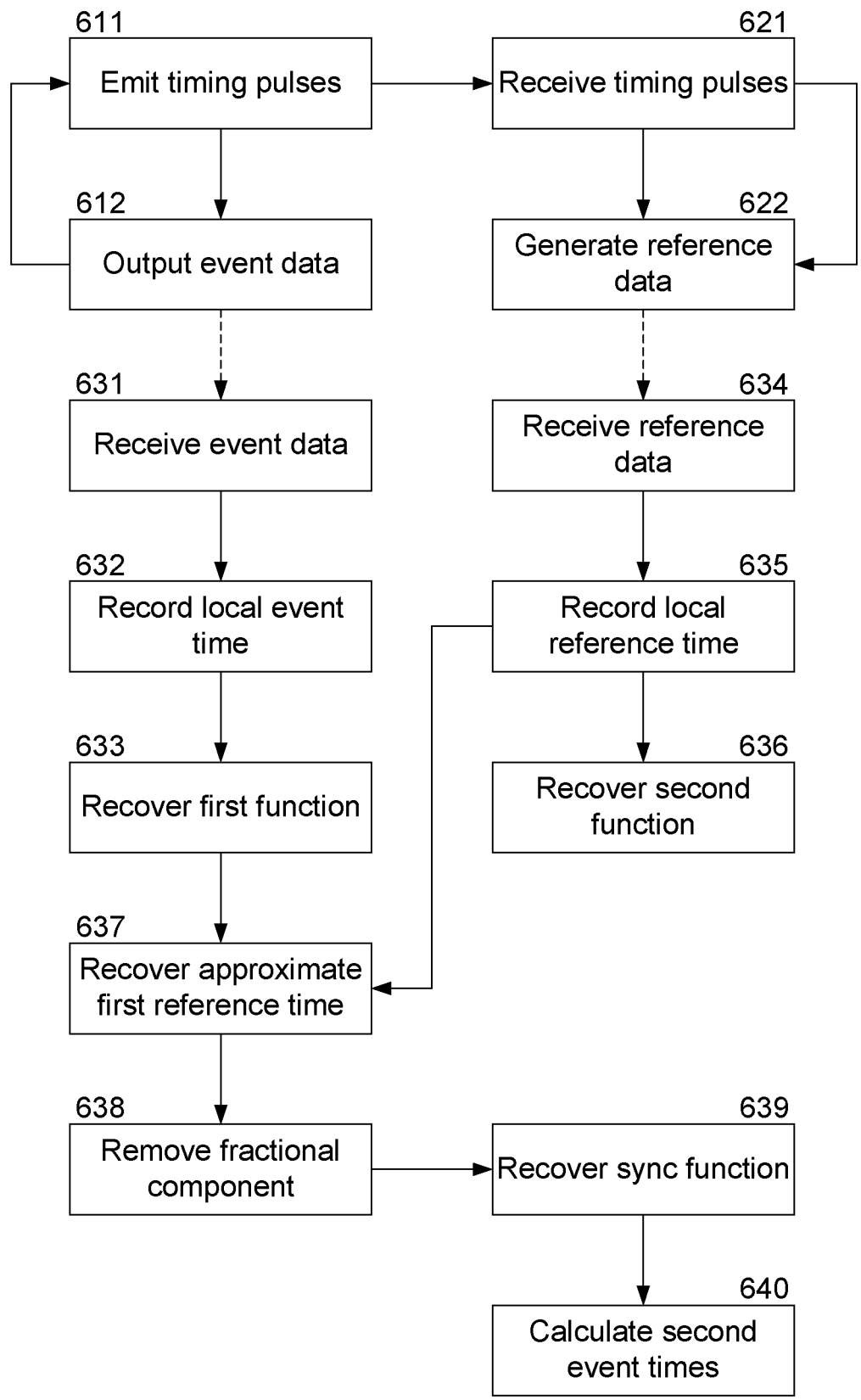
FIG. 6 is a flow chart of a further example of a method for use in performing clock synchronisation; and, FIG. 7 is a flow chart of an example of a method for use in updating clock synchronisation functions.

An example of the process for synchronising data using the first and second clock signals will now be described in more detail with reference to FIG. 6.

In this example, at step 611, the first device 310 emits timing pulses, such as PPS pulses generated at one second intervals, based on the first clock signal. Recorded event data, including details of events and an associated time stamp based on the first clock signal, are transmitted from the interface 313 at step 612. Simultaneously, the second device 420 receives the timing pulses at step 621, and generates the reference data at step 622 based on the receipt time of the timing pulses, with this being output via the interface 423.

At step 631, the processing system 530 receives the event data from the first device 310, and records an approximate local event time, for each event, at step 632, using this to recover a first function at step 633, typically by performing a linear regression using the first and approximate local times over multiple events.

At step 634, the processing system 530 receives the reference data from the first second device 420, and records an approximate local reference time for each timing pulse, at step 635, again using this to recover the second function at step 636 by performing a linear regression using the local reference time and reference time.

At step 637, the processing system 530 calculates an approximate first time for each timing pulse, using the first and second functions. In this example, timing pulses are generated at one second intervals, and so the processing system 530 removes fractional components from the approximate first time, at step 638, to thereby recover an actual first time for the timing pulses. This in turn is used to recover the synchronisation function at step 639, using a linear regression performed using the reference times and the actual first time for the timing pulses. The synchronisation function can then be used to perform clock synchronisation of the first and second clock signals, by converting the timing of events within the event data can be converted from the first to the second clock signal, allowing this to be processed along with data from the other devices 140, which are also timed based on the second clock signal.

Figure 7:
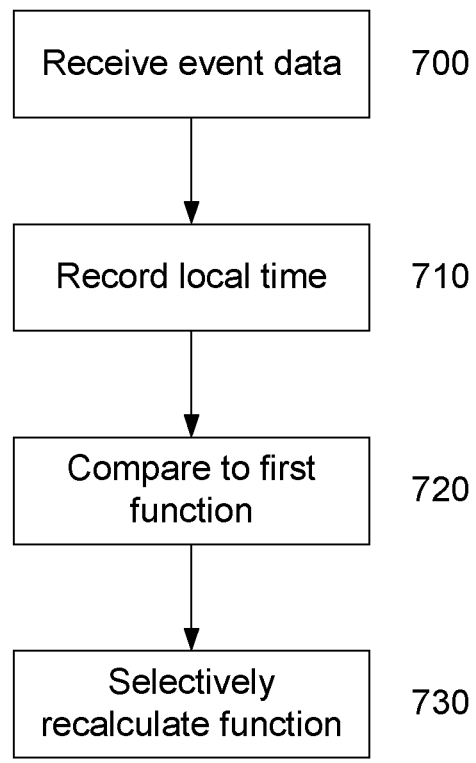

An example of the process for monitoring the timing of event data and using this to re-synchronise the clocks will now be described with reference to FIG. 7.

In this example, at step 700, the processing system 530 receives event data and records the local time based on the local clock at step 710. At step 720, the processing system compares the local time and the first event time to the first function, and uses this to determine if the first clock has changed. If so, the processing system 530 selectively recalculates the functions at step 730, so that the functions reflect the current relative timing of the first and second clocks.

Whilst the above described systems and processes have been described with respect to a single first device, it will be appreciated that the techniques could be extended to multiple first devices, for example in the event that the system incorporated both a LiDAR and GPS sensing unit. Furthermore, whilst reference has been made to the field of sensing, for example for autonomous vehicle navigation, it will be appreciated that such reference is not intended to be limiting, and that the techniques could be applied in a wide range of different fields.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means±20%.

Persons skilled in the art will appreciate that numerous variations and modifications will become apparent. All such variations and modifications which become apparent to persons skilled in the art, should be considered to fall within the spirit and scope that the invention broadly appearing before described.

What is claimed is:

1. A method of performing clock synchronisation across multiple devices, the method including:
   a) in a first device that includes a first clock:
      i) emitting timing pulses based on a first clock signal that is generated by the first clock; and,
      ii) outputting event data including events and associated first event times based on the first clock signal;
   b) in a second device that includes a second clock:
      i) receiving the timing pulses; and, ii) generating reference data including an indication of each timing pulse and an associated reference time, the associated reference time being indicative of a time of receipt of the timing pulse by the second device based on a second clock signal that is generated by the second clock; and, c) in one or more processing devices:
   i) receiving the event data from the first device;
   ii) recording an estimated local event time for each event based on a time of local receipt of the event data determined using a local clock signal that is generated by a local clock;
   iii) using the estimated local event times and the associated first event times to perform a regression to derive a first function that relates the first clock signal and the local clock signal;
   iv) using the first function and the reference data to perform a regression to derive a synchronisation function relating the first and second clock signals; and,
   v) using the synchronisation function to map events between the first and second clock signals by mapping between the associated first event times based on the first clock signal and times based on the second clock signal.

2. The method according to claim 1, wherein the method includes, in the one or more processing devices:
   a) determining a second function that relates the second clock signal and the local clock signal; and,
   b) using the second function to determine the synchronisation function.

3. The method according to claim 2, wherein the method includes:
   a) in the second device, outputting the reference data; and,
   b) in the one or more processing devices,
      i) receiving the reference data;
      ii) recording an approximate local reference time for the indication of each timing pulse based on a time of local receipt of the reference data determined using the local clock signal; and,
      iii) using the approximate local reference times and the associated reference times to derive the second function.

4. The method according to claim 1, wherein the method includes, in the one or more processing devices:
   a) using the first function and the reference data to recover approximate first reference times for the timing pulses;
   b) resolving accurate first reference times for the timing pulses; and,
   c) using the accurate first reference times to determine the synchronisation function.

5. The method according to claim 1, wherein the second clock signal is the local clock signal and the one or more processing devices are part of the second device.

6. The method according to claim 1, wherein the second device is a master clock used to synchronise a number of other devices.

7. The method according to claim 1, wherein at least one of the first function and the synchronisation function is based on a linear fit.

8. The method according to claim 1, wherein the method includes, in the one or more processing devices, using the synchronisation function to calculate second event times based on the second clock signal to synchronise events with the second clock signal.

9. The method according to claim 1, wherein the method includes, in the one or more processing devices:
   a) comparing received event data to the first function; and,
   b) selectively recalculating at least one of the first function and the synchronisation function depending on results of the comparison.

10. The method according to claim 9, wherein the method includes, in the one or more processing devices, recalculating at least one of the first function and the synchronisation function if a discrepancy is identified based on results of the comparison.

11. A method of performing clock synchronisation across multiple devices, the method including:
    a) in a first device that includes a first clock:
       i) emitting timing pulses based on a first clock signal that is generated by the first clock; and,
       ii) outputting event data including events and associated first event times based on the first clock signal;
    b) in a second device that includes a second clock:
       i) receiving the timing pulses; and,
       ii) outputting reference data including an indication of each timing pulse and an associated reference time, the associated reference time being indicative of a time of receipt of the timing pulse by the second device based on a second clock signal that is generated by the second clock; and,
    c) in one or more processing devices:
       i) receiving the event data from the first device;
       ii) recording an estimated local event time for each event based on a time of local receipt of the event data determined using a local clock signal that is generated by a local clock;
       iii) using the estimated local event times and the associated first event times to perform a regression to derive a first function that relates the first clock signal and the local clock signal;
       iv) receiving the reference data;
       v) recording an estimated local reference time for the indication of each timing pulse based on a time of local receipt of the reference data determined using the local clock signal;
       vi) using the estimated local reference times and the associated reference times to derive a second function that relates the second clock signal and the local clock signal;
       vii) using the first and second functions and the reference data to determine a third function relating the first and second clock signals; and,
       viii) using the third function to map events between the first and second clock signals by mapping between the associated first event times based on the first clock signal and times based on the second clock signal.

12. An apparatus for performing clock synchronisation across multiple devices including:
    a) a first device including a first clock, the first device configured to:
       i) emit timing pulses based on a first clock signal that is generated by the first clock; and,
       ii) output event data including events and associated first event times based on the first clock signal; and,
    b) a second device that includes a second clock, the second device configured to:
       i) receive the timing pulses; and,
       ii) generate reference data including an indication of each timing pulse and an associated reference time, the associated reference time being indicative of a time of receipt of the timing pulse by the second device based on a second clock signal that is generated by the second clock, the apparatus including one or more processing devices configured to:
(1) receive the event data from the first device;
(2) record an estimated local event time for each event based on a time of local receipt of the event data determined using a local clock signal that is generated by a local clock;
(3) use the estimated local event times and the associated first event times to perform a regression to derive a first function that relates the first clock signal and the local clock signal;
(4) use the first function and the reference data to perform a regression to derive a synchronisation function relating the first and second clock signals; and,
(5) use the synchronisation function to map events between the first and second clock signals by mapping between the associated first event times based on the first clock signal and times based on the second clock signal.

13. The apparatus according to claim 12, wherein the one or more processing devices are configured to:
a) determine a second function that relates the second clock signal and the local clock signal; and,
b) use the second function to determine the synchronisation function.

14. The apparatus according to claim 13, wherein the one or more processing devices are configured to:
a) receive the reference data from the second device;
b) record an approximate local reference time for the indication of each timing pulse based on a time of local receipt of the reference data determined using the local clock signal; and,
c) use the approximate local reference times and the associated reference times to derive the second function.

15. The apparatus according to claim 12, wherein the one or more processing devices are configured to:
a) use the first function and the reference data to recover approximate first reference times for the timing pulses;
b) resolve accurate first reference times for the timing pulses; and,
c) use the accurate first reference times to determine the synchronisation function.

16. The apparatus according to claim 12, wherein the second clock signal is the local clock signal and the one or more processing devices are part of the second device.

17. The apparatus according to claim 12, wherein the second device is a master clock used to synchronise a number of other devices.

18. The apparatus according to claim 12, wherein at least one of the first function and the synchronisation function is based on a linear fit.

19. The apparatus according to claim 12, wherein the one or more processing devices are configured to use the synchronisation function to calculate second event times based on the second clock signal to synchronise events with the second clock signal.

20. The apparatus according to claim 12, wherein the one or more processing devices are configured to:
a) compare received event data to the first function; and,
b) selectively recalculate at least one of the first function and the synchronisation function depending on results of the comparison.

21. The apparatus according to claim 20, wherein the one or more processing devices are configured to recalculate at least one of the first function and the synchronisation function if a discrepancy is identified based on results of the comparison.

22. An apparatus for performing clock synchronisation across multiple devices including:
a) a first device including a first clock, the first device configured to:
  i) emit timing pulses based on a first clock signal that is generated by the first clock; and,
  ii) output event data including events and associated first event times based on the first clock signal; and,
b) a second device that includes a second clock, the second device configured to:
  i) receive the timing pulses; and,
  ii) output reference data including an indication of each timing pulse and an associated reference time, the associated reference time being indicative of a time of receipt of the timing pulse by the second device based on a second clock signal that is generated by the second clock, wherein the apparatus includes one or more processing devices configured to:
(1) receive the event data from the first device;
(2) record an estimated local event time for each event based on a time of local receipt of the event data determined using a local clock signal that is generated by a local clock;
(3) use the estimated local event times and the associated first event times to perform a regression to derive a first function that relates the first clock signal and the local clock signal;
(4) receive the reference data;
(5) record an estimated local reference time for the indication of each timing pulse based on a time of local receipt of the reference data determined using the local clock signal;
(6) use the estimated local reference times and the associated reference times to derive a second function that relates the second clock signal and the local clock signal;
(7) use the first and second functions and the reference data to determine a third function relating the first and second clock signals; and,
(8) use the third function to map events between the first and second clock signals by mapping between the associated first event times based on the first clock signal and times based on the second clock signal.

* * * * *